J. R. COE.
APPARATUS FOR HANDLING CONTAINERS OF LIQUID.
APPLICATION FILED AUG. 13, 1920.
1,395,040.
Patented Oct. 25, 1921.
3 SHEETS—SHEET 1.
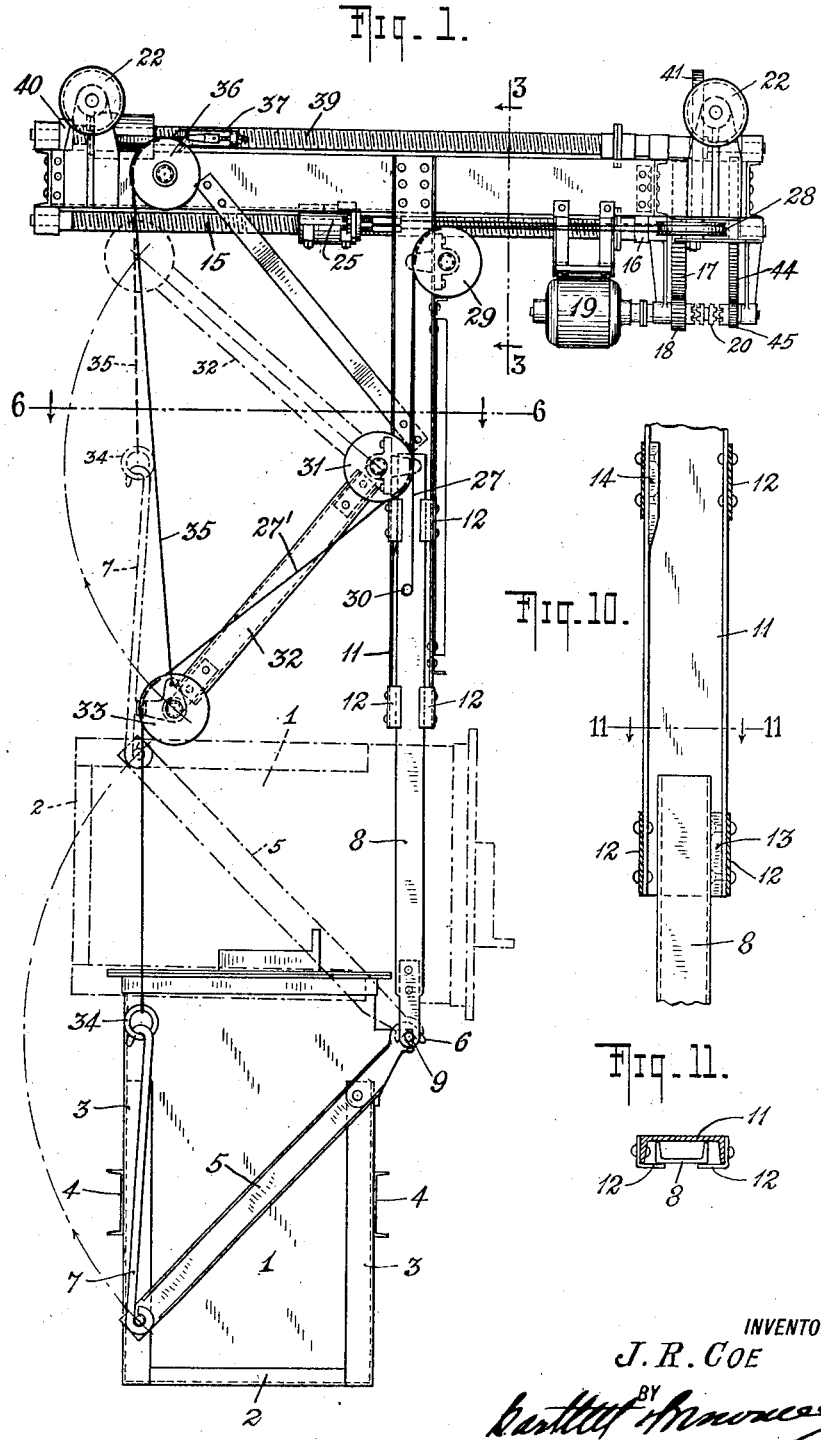
INVENTOR
J. R. COE
BY
ATTORNEYS

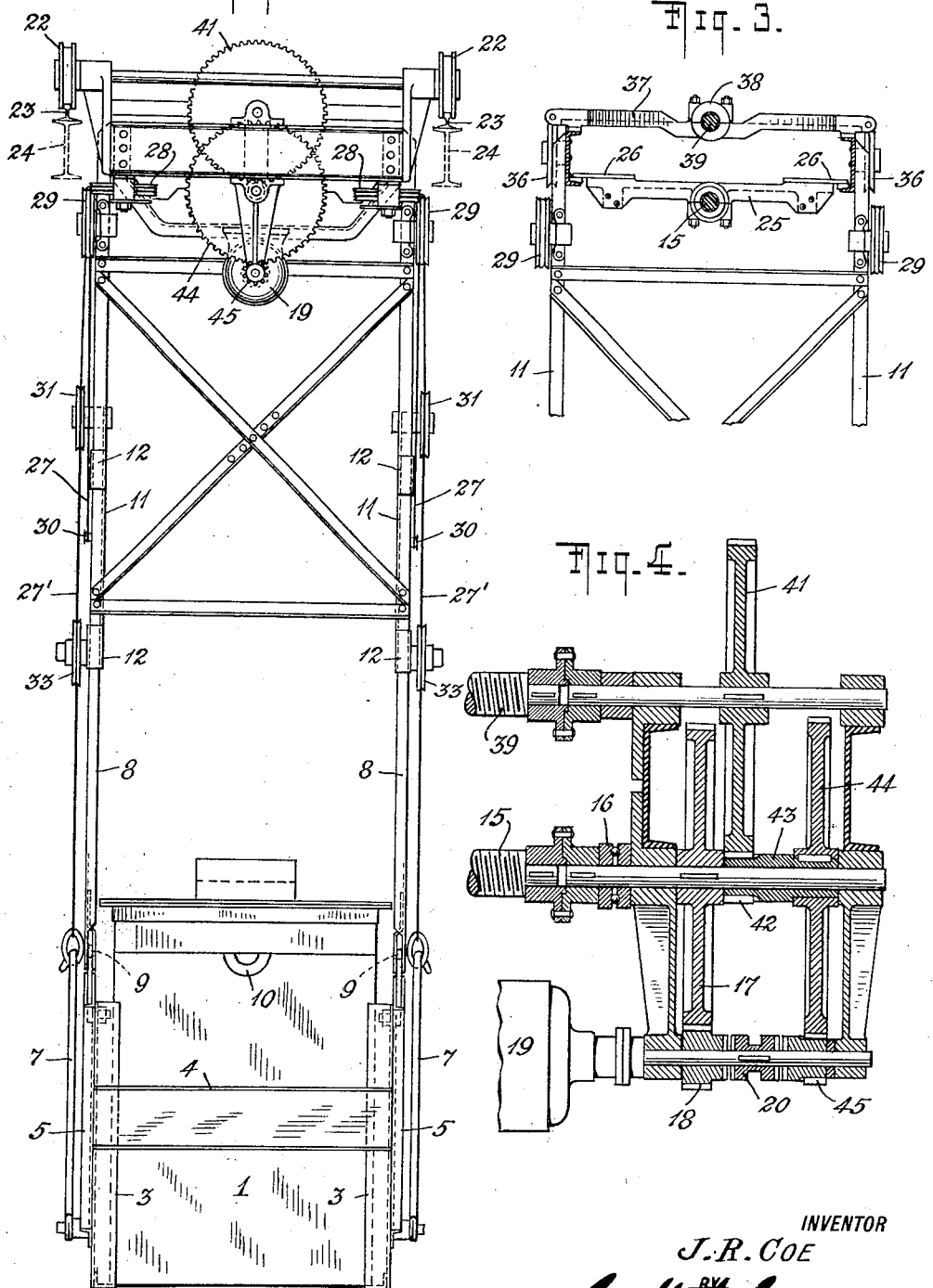

J. R. COE.
APPARATUS FOR HANDLING CONTAINERS OF LIQUID.
APPLICATION FILED AUG. 13, 1920.
1,395,040.
Patented Oct. 25, 1921.
3 SHEETS—SHEET 3.
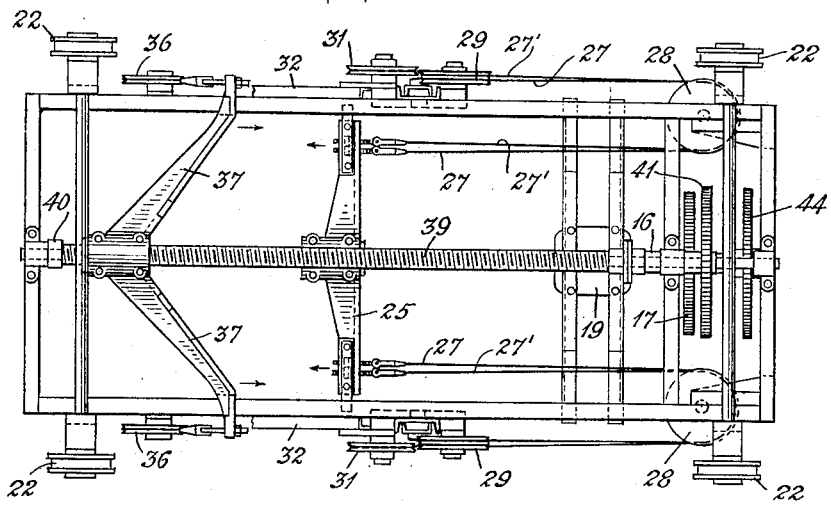
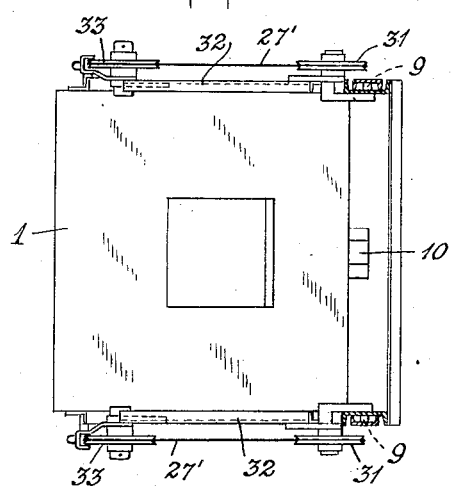
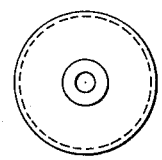
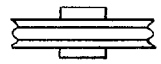
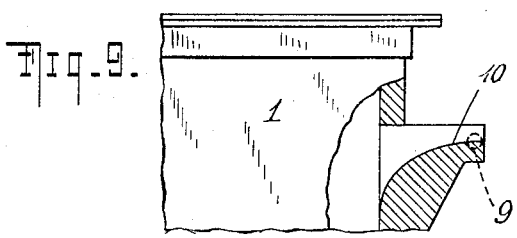
INVENTOR
J. R. COE
BY
*Bartlett* *Brownell*
ATTORNEYS

UNITED STATES PATENT OFFICE.

JAMES ROBERT COE, OF WATERBURY, CONNECTICUT, ASSIGNOR TO THE AMERICAN BRASS COMPANY, OF WATERBURY, CONNECTICUT, A CORPORATION OF CONNECTICUT.

APPARATUS FOR HANDLING CONTAINERS OF LIQUID.

1,395,040.     Specification of Letters Patent.     Patented Oct. 25, 1921.

Application filed August 13, 1920. Serial No. 403,295.

*To all whom it may concern:*

Be it known that I, JAMES R. COE, a citizen of the United States, residing at Waterbury, county of New Haven, State of Connecticut, have invented a certain new and useful Improvement in Apparatus for Handling Containers of Liquid, of which the following is a full, clear, and exact description.

My invention relates to apparatus for handling and tilting containers of liquid having pouring lips and has for its object to provide means for lifting such a container to a desired height and tilting it about an axis approximately in line with the pouring lip, which means shall be more simple and easier to manufacture and operate than apparatus used heretofore. It further has for its object to provide means in which brakes are unnecessary for holding the container in elevated position. It further has for its object to provide an apparatus in which but one motor is necessary in order to accomplish both the lifting and tilting operations.

The following is a description of an embodiment of my invention, reference being had to the accompanying drawings, in which, Figure 1 is a side elevation of the apparatus and container lifted thereby;

Fig. 2 is a front elevation of the same;

Fig. 3 is a detail on the line 3—3, Fig. 1;

Fig. 4 is an enlarged sectional detail through the gearing driven by the motor;

Fig. 5 is a plan view of the apparatus;

Fig. 6 is a section on the line 6—6, Fig. 1;

Figs. 7 and 8 are details of one of the sheaves;

Fig. 9 is a detail of the upper portion of the container shown partly in section for the purpose of indicating the relation of the pouring lip of the container to the axis about which the container tilts;

Fig. 10 is a detail view showing the relations of the slide and guide used in my invention when the slide is in its lowermost position; and, Fig. 11 is a detail on the line 11—11, Fig. 10.

Referring more particularly to the drawings, the container comprises a furnace or pot 1 and a frame 2 within which the furnace or pot is removably held. This frame 2 has four upright portions 3 at its several corners, the front and rear members of which are connected together by channel irons 4, the side members being connected together by bottom pieces and a diagonal channel iron 5. The upper end of this diagonal channel iron is provided with a rigid hook 6, while to the lower end is pivotally connected a hook 7 whose upper end extends nearly to the top of the container. Slides 8 in the form of channel bars, as shown in Fig. 11, carry pins 9 which are normally held within the hook 6, the axes of these pins when so held being approximately in line with the pouring lip 10 of the container. These slides move upwardly and downwardly in channel iron guides 11, being held from sidewise movement by overhanging flanges 12 secured to the channel irons 11. The channel iron guides 11 are provided near their lower ends with filling blocks 13 at the front edges of the slides 8 and with other filling blocks 14 which are engaged by the rear edges of the slides 8 when they are in elevated position, as shown in Fig. 1. The downward ends of the blocks 14 are beveled so as to not block the upward movement of the slides 8. The result of these blocks is that when the slides 8 are in their downward positions so as not to engage the blocks 14, their upper ends and also their lower ends are capable of considerable movement, this being desirable in order to enable the pins 9 to be easily moved and introduced into the hooks 6. When, however, the container has been elevated, the upper ends of the slides 8 engaging the blocks 14 exert rearward thrusts on those blocks as the container is tipped and forward thrusts on the blocks 13, resulting in the rigid holding of the slides 8 and therefore the rigid holding of the axis of the pins 9 during the period when the container is being tilted.

In order to lift the container I provide a screw 15 having at its forward end a thrust-bearing 16 and carrying a gear 17 which meshes with a pinion 18, which may be connected to and disconnected from the shaft of a motor 19 by a clutch 20 splined upon that shaft. The screw 15 is mounted in a movable trolley frame 21 having wheels 22 which run on the tracks 23 carried by the bars 24 of an ordinary traveling crane. This trolley frame carries the motor 19.

The screw 15 carries a yoke 25, which it moves in one direction or the other, according as it is driven by the motor 19. This yoke has extension plates 26, which bear upon the lower internal flanges of the channel bars 2, as shown in Fig. 3. Connected to this yoke are two sets of cables 27—27', each set comprising two cables. These four cables are connected through the hooks 6 and 7 to the front and rear portions of the container on each side thereof. The cables leading from each arm of the yoke 25 pass over horizontal double-grooved sheaves 28 located on the respective sides of the trolley frame and thence pass over vertical double-grooved sheaves 29 secured to the respective guides 11. The cables 27 are then secured to studs 30 on the respective slides 8. The guides 11 carry additional single-grooved guiding sheaves 31, about whose common axis is pivotally mounted a frame 32 having on its lower end guiding sheaves 33. The cables 27', after passing over the sheaves 29, pass beneath the sheaves 31 and above the sheaves 33 and are connected to rings 34, adapted to be easily connected to or disconnected from the hook 7. The plane of the frame 32 is approximately and preferably closely parallel to the plane passing through the axes at the lower ends of the hooks 7 and through the pins 9.

From the foregoing, it will be seen that the operation of the screw 15 in one direction will draw up both sets of cables 27 and 27' so as to lift the container, the pouring lip of which during the lifting period will be confined to a definite vertical plane by the action of the slides 8 and the guides 11, and that after the container has been lifted to any desired height it will, when tilted, tilt about the axis of the pin 9 approximately in line with the pouring lip.

During the lifting operation the frame 32 is held by suitable means in substantially the position shown in Fig. 1. The means I employ for holding the frame 32 I also use for tilting the container when lifted, the same consisting of a set of cables 35 connected to the lower end of the frame 32 and passing over vertical sheaves 36 carried by the channel bars 2 of the trolley. After passing over the sheaves 36, the cables 35 are connected by suitable means to a yoke 37 whose outer ends rest upon the upper inturned flanges of the channel bars 2 so as to be guided thereby. This yoke 37 is provided with a screw-threaded journal bearing 38, which engages a second screw 39 journaled on the trolley frame. This worm 39 has a thrust-bearing 40 at its rearward end and has at its front end a gear 41 which is engaged by a pinion 42 mounted upon a hollow shaft 43 which is carried by an extension of the screw 15. This hollow shaft 43 has rigidly connected to it a gear 44 which engages a gear 45 loosely mounted upon the motor shaft and adapted to be operatively connected thereto by a movement of the clutch member 20. The motor 19 has the ordinary controlling circuits whereby its direction of rotation can be reversed if desired and by means of the train of gearing thus described can be used to operate the shafts 15 or 39 in either direction at desired speeds. The reduction shown is substantially 50 to 1 for the shaft 39, while for the shaft 15 it is substantially 5 to 1. By means of these respective reductions and the proper pitch of the screws 15 and 39, the maximum travel of the yoke 25 along the screw with a 1200 R. P. M. motor is ten feet per minute, while the maximum travel of the yoke 37 along the screw 39 is one foot per minute. This means that the container can be lifted at a fairly rapid rate and can then be tilted at a very slow rate.

In operating the apparatus, the trolley is moved by the traveling crane to the point desired and the cables lowered so that the rings 34 can be hooked upon the hooks 7 and the pins 9 placed within the hooks 6. After this has been done, the direction of rotation of the motor is reversed, the clutch 20 being thrown to the left, so as to drive the worm 15 in such a manner as to move the yoke 25 to the left, resulting in the lifting of the container. When the container has been lifted to the desired height, the motor 19 is stopped and the clutch 20 is thrown to the right so as to engage the clutch surface upon the pinion 45. The motor is then started up in the proper direction to cause the worm 39 to revolve so as to move the yoke 37 to the right, resulting in lifting the frame 32 about its pivot and thereby lifting the rear end of the container and tilting it about the axis of the pin 9, which is held against lateral movement in a definite vertical plane by the engagement of the slides 8 with the guides 11. These guides also guide the axis during the entire lifting operation. After the container has been emptied, the frame 32 is then lowered, the motor 19 being reversed for that purpose, until the container is again in vertical position. The clutch 20 is then thrown and the motor operated to cause the yoke 25 to move to the right and lower the container to any desired position.

It will be seen from the foregoing that only one motor is necessary for the operating of two sets of cables to lift the container and that on account of the screw action, whenever the motor is stopped, the container is held in its lifted position without the necessity of any braking devices. It will be further seen that no limit switches are necessary for the controlling of the motor, since if the motor is permitted to run too long, the most that can happen will be to cause it to open the fuse or circuit-breaker in its operating circuit.

In a similar manner, on account of the screw action, no braking devices are necessary for holding the rear end of the container in any particular position after the container has been tilted. It will be further seen that only one motor is used for performing both the lifting and tilting operations and that for a given speed of motor a greatly reduced speed is secured for tilting, while a higher speed of the lifting cables is attained.

The location of the sheaves 31 approximately in line with the pivotal connection of the frame 32 enables that frame to be lifted and lowered approximately the same as though the cable 27' were fixedly secured to the frame 32 during the lifting operation, and if the axis of the sheave 31 is directly in line with the pivotal axis of the frame 32, as is the preferable construction, the effect of the lifting of the frame 32 upon the cable 27 will actually be the same as though the cable 27 were positively secured to that frame.

By connecting the cable 27' to the rigid hook 7, which is pivotally connected to the lower end of the container, the ring 34 need never be below the pin 9 when the lifting apparatus is being moved from one point to another. The connection of the cables 27' to the lower portions of the container by means of the hook 7 is necessary in order to be able to secure the tilting of the container through an arc of 90° by the movement of the frame 32 through a similar arc, as shown in dotted lines in Fig. 1.

As will be evident to those skilled in the art, my invention permits of various modifications without departing from the spirit thereof or the scope of the appended claims.

What I claim is:

1. In an apparatus for lifting and tilting a container having a pouring lip, the combination of means for holding said pouring lip in a definite vertical plane while said container is being tilted, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being adjacent and approximately parallel, a common means located above said frame for drawing both said front and rear cables upward simultaneously, and means for raising and lowering the rear end of said frame.

2. In an apparatus for lifting and tilting a container having a pouring lip, the combination of means for holding said pouring lip in a definite vertical plane while said container is being tilted and guiding it while being lifted to any desired height, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being adjacent and approximately parallel, a common means located above said frame for drawing both said front and rear cables upward simultaneously, and means for raising and lowering the rear end of said frame.

3. In an apparatus for lifting and tilting a container having a pouring lip, the combination of means for holding said pouring lip in a definite vertical plane while said container is being tilted, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being closely adjacent and substantially parallel, a common means located above said frame for drawing both said front and rear cables upward, and means for raising and lowering the rear end of said frame, said guides being provided with anti-friction sheaves for said cables, and means for connecting said cables to said container providing pivoted points lying in a plane substantially parallel to the plane of said frame.

4. In an apparatus for lifting and tilting a container having a pouring lip, the combination of means for holding said pouring lip in a definite vertical plane while said container is being tilted, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being adjacent and approximately parallel, a common means located above said frame for drawing both said front and rear cables upward, and means for raising and lowering the rear end of said frame, said guides being provided with sheaves for said cables, said holding means consisting of depending guides and slides moving therein, said container having trunnions substantially in line with said pouring lip, to which said slides are connected.

5. In an apparatus for lifting and tilting a container having a pouring lip, the combination of means for holding said pouring lip in a definite vertical plane while said container is being tilted, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being adjacent and approximately parallel, a common means located above said frame for drawing both said front and rear cables upward, and means for raising and lowering the rear end of said frame, said means for raising said cables comprising a screw and yoke thereon to which said cables are connected.

6. In an apparatus for lifting and tilting a container having a pouring lip, the combination of means for holding said pouring lip in a definite vertical plane while said container is being tilted, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being adjacent and approximately parallel, a common means located above said frame for drawing both said front and rear cables upward, and means for raising and lowering said frame comprising a screw and a yoke thereon and cables extending from said yoke to the rear portion of said frame.

7. In an apparatus for lifting and tilting a container having a pouring lip, the combination of means for holding said pouring lip in a definite vertical plane while said container is being tilted, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being adjacent and approximately parallel, a common means located above said frame for drawing both said front and rear cables upward, comprising a screw and yoke thereon to which said cables are connected, and means for raising and lowering the rear end of said frame comprising a screw and a yoke thereon and cables extending from said yoke to the rear portion of said frame.

8. In an apparatus for lifting and tilting a container having a pouring lip, the combination of means for holding said pouring lip in a definite vertical plane while said container is being tilted, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being adjacent and approximately parallel, a common means located above said frame for drawing both said front and rear cables upward, comprising a screw and yoke thereon to which said cables are connected, means for raising and lowering the rear end of said frame comprising a screw and a yoke thereon and cables extending from said yoke to the rear portion of said frame, a single motor for driving both of said screws, two trains of reduction gearing through which said motor is adapted to drive said screws respectively, and a clutch between both sets of gearing and said motor for connecting and disconnecting said motor with either train of gearing, as desired.

9. In an apparatus for lifting and tilting a container having a pouring lip, the combination of means for holding said pouring lip in a definite vertical plane while said container is being tilted, lifting cables connected to the front and rear portions of said container respectively, a frame located above said container and having one end pivotally supported adjacent to said vertical plane and having guides thereon adjacent to its rear end over which said rear cables pass, guides adjacent to said vertical plane beneath which said rear cables pass, said front and rear cables at points above said second guides being adjacent and approximately parallel, a common means located above said frame for drawing both said front and rear cables upward, comprising a screw and yoke thereon to which said cables are connected, means for raising and lowering the rear end of said frame comprising a screw and a yoke thereon and cables extending from said yoke to the rear portion of said frame, a single motor for driving both of said screws, two trains of reduction gearing through which said motor is adapted to drive said screws respectively, and a clutch between both sets of gearing and said motor for connecting and disconnecting said motor with either train of gearing, as desired, the train driving the screw actuating said frame raising cables being a train of greater reduction than the other train.

JAMES ROBERT COE.